(12) United States Patent  (10) Patent No.: US 8,861,979 B2
Liu  (45) Date of Patent: Oct. 14, 2014

(54) COHERENT RECEIVER APPARATUS AND CHROMATIC DISPERSION COMPENSATION METHOD

(75) Inventor: Ning Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 218 days.

(21) Appl. No.: 13/565,458

(22) Filed: Aug. 2, 2012

(65) Prior Publication Data

US 2013/0034352 A1 Feb. 7, 2013

Related U.S. Application Data

(63) Continuation of application No. PCT/CN2011/077885, filed on Aug. 1, 2011.

(51) Int. Cl.
*H04B 10/06* (2006.01)
*H04B 10/2513* (2013.01)
*H04B 10/61* (2013.01)

(52) U.S. Cl.
CPC .... *H04B 10/25133* (2013.01); *H04B 2210/252* (2013.01); *H04B 10/6161* (2013.01)
USPC ............ 398/205; 398/206; 398/207; 398/208

(58) Field of Classification Search
USPC ............................................ 398/29, 202–214
See application file for complete search history.

(56) References Cited

U.S. PATENT DOCUMENTS 6,829,549 B2  12/2004 Van Schyndel
7,636,525 B1 * 12/2009 Bontu et al. ................... 398/208

2003/0174311 A1  9/2003 Wilson et al.
2004/0067064 A1  4/2004 McNicol et al.
2008/0279563 A1 11/2008 Shu (Continued)

FOREIGN PATENT DOCUMENTS

CN    1482480 A     3/2004
CN  101322335 A    12/2008

(Continued)

OTHER PUBLICATIONS

Campillo, "Chromatic Dispersion-Monitoring Technique Based on Phase-Sensitive Detection" IEEE Photonics Technology Letters, vol. 17, No. 6, Jun. 2005.

(Continued)

*Primary Examiner* — David Payne
*Assistant Examiner* — Casey Kretzer
(74) *Attorney, Agent, or Firm* — Brinks Gilson & Lione

(57) ABSTRACT

The present disclosure relates to the field of communications, and in particular, to a coherent receiver apparatus and a chromatic dispersion compensation method. The apparatus includes a polarization beam splitter and a chromatic dispersion compensation module. An optical splitter is disposed in front of the polarization beam splitter, and a chromatic dispersion monitoring module is connected between the optical splitter and the chromatic dispersion compensation module. The optical splitter is configured to split a modulated optical signal received by the coherent receiver apparatus and then transmit the split modulated optical signal to the chromatic dispersion monitoring module and the polarization beam splitter. The chromatic dispersion monitoring module is configured to perform chromatic dispersion monitoring on the modulated optical signal to determine a chromatic dispersion range of the modulated optical signal, and enable the chromatic dispersion compensation module to perform chromatic dispersion compensation in the chromatic dispersion range.

8 Claims, 6 Drawing Sheets

(56) References Cited

U.S. PATENT DOCUMENTS

| | | | |
|---|---|---|---|
| 2010/0021179 A1* | 1/2010 | Kikuchi | 398/183 |
| 2010/0074632 A1 | 3/2010 | Zhou | |
| 2011/0064421 A1 | 3/2011 | Zhang et al. | |
| 2011/0123191 A1* | 5/2011 | Murakami et al. | 398/29 |
| 2012/0076493 A1 | 3/2012 | Zhang | |

FOREIGN PATENT DOCUMENTS

| | | |
|---|---|---|
| CN | 101965698 A | 2/2011 |
| EP | 1271814 A2 | 1/2003 |
| JP | 2009296290 A | 12/2009 |

OTHER PUBLICATIONS

Hirano et al., "Dispersion Accommodation Scheme Comparing Relative Bit-Phase of Two SSB Signals Generated from Spectrally Filtered CS-RZ Signal" Electronics Letters, vol. 38, No. 12, Jun. 6, 2002.

Ku et al., "Chromatic Dispersion Monitoring Technique Using Birefringent Fiber Loop" Optical Society of America, 2006.

Nezam et al., "Chromatic Dispersion Monitoring Using Partial Optical Filtering and Phase-Shift Detection of Bit Rate and Doubled Half Bit Rate Frequency Components" Optical Society of America, 2004.

Park et al., "Performance Comparisons of Chromatic Dispersion-Monitoring Techniques Using Pilot Tones" IEEE Photonics Technology Letters, vol. 15, No. 6, Jun. 2003.

Yu et al., "Chromatic Dispersion Monitoring Technique Using Sideband Optical Filtering and Clock Phase-Shift Detection" Journal of Lightwave Technology, vol. 20, No. 12, Dec. 2002.

International Search Report and Written Opinion of the International Searching Authority issued in corresponding PCT Patent Application No. PCT/CN2011/077885, mailed May 10, 2012.

Extended European Search Report issued in corresponding European Patent Application No. 11849899.7, mailed Jan. 28, 2013.

International Search Report issued in corresponding PCT Patent Application No. PCT/CN2011/077885, mailed May 10, 2012.

Office Action and Search Report issued in corresponding Chinese Patent Application No. 201180001753.9, mailed Jul. 1, 2013, 9 pages.

* cited by examiner

COHERENT RECEIVER APPARATUS AND CHROMATIC DISPERSION COMPENSATION METHOD

CROSS-REFERENCE TO RELATED APPLICATIONS

This application is a continuation of International Application No. PCT/CN2011/077885, filed on Aug. 1, 2011, which is hereby incorporated by reference in its entirety.

FIELD OF THE DISCLOSURE

The present disclosure relates to the field of communications, and in particular, to a coherent receiver apparatus and a chromatic dispersion compensation method.

BACKGROUND

With the emergence of high-capacity services, the optical communication system has the evolution tendency from 10 Gb/s to 40 Gb/s, 100 Gb/s, or higher rates. However, as the rate increases, the pulse period is shortened and the effect of the chromatic dispersion (CD, chromatic dispersion) magnifies quadratically. To achieve a high transmission rate, coherent optical communications technologies are introduced to the high-speed optical transmission. In a coherent optical communications system, the chromatic dispersion can be compensated effectively by using the electronic chromatic dispersion compensation technology.

By combining the polarization multiplexing with the coherent reception technology, long-distance transmission of above 100 Gb/s may be achieved. FIG. 1 shows a typical polarization multiplexing coherent receiver. As shown in FIG. 1, a received optical signal is split by a polarization beam splitter 101 into an x path of a signal and a y path of a signal, the signals are fed into 90° frequency mixers 103$x$ and 103$y$ respectively, and then the signals pass through a photodetector 104 (indicated as PD in FIG. 1) and an analog-to-digital conversion module 105 (indicated as A/D in FIG. 1) to obtain digital signals Ix, Qx, Iy, and Qy through N times of sampling (N is 2 normally). The signals are input into a chromatic dispersion compensation module 106$x$ at the x path and a chromatic dispersion compensation module 106$y$ at the y path respectively, so that the chromatic dispersion compensation is completed. After the chromatic dispersion compensation, the signals are input into a polarization compensation module 107 formed by 2*2 butterfly filters to complete polarization demultiplexing and equalizing. After the equalizing, the signals are input into phase recovery modules 108$x$ and 108$y$ and decoding modules 109$x$ and 109$y$ respectively to recover the original bit stream. To track the rapid change of a channel, an adaptive filter is usually used for the polarization compensation module 107. A coefficient update module 110 is configured to update a coefficient of the filter of the polarization compensation module 107 in real time. However, when the chromatic dispersion compensation module performs the chromatic dispersion compensation, it needs to foresee a chromatic dispersion value to determine a compensation transfer function. When the chromatic dispersion value is unknown, an existing architecture needs to scan all kinds of possible chromatic dispersion values in an electric layer to find a chromatic dispersion value that makes a certain pointer (such as BER/Q) optimal so as to compensate the chromatic dispersion value.

It can be seen from the above description that, all kinds of possible chromatic dispersion values in the electric layer need to be scanned when the chromatic dispersion compensation is performed in the prior art. The operation flow is complicated, thereby reducing the speed of the compensation algorithm.

SUMMARY

Accordingly, the present disclosure provides a coherent receiver apparatus and a chromatic dispersion compensation method. In the present disclosure, chromatic dispersion monitoring may be implemented in an optical layer, thereby increasing the speed of the chromatic dispersion compensation.

In one embodiment, a coherent receiver apparatus provided by an embodiment of the present disclosure includes a polarization beam splitter and a chromatic dispersion compensation module, where an optical splitter is disposed in front of the polarization beam splitter, and a chromatic dispersion monitoring module is connected between the optical splitter and the chromatic dispersion compensation module; the optical splitter is configured to split a modulated optical signal received by the coherent receiver apparatus and then transmit the split modulated optical signal to the chromatic dispersion monitoring module and the polarization beam splitter; and the chromatic dispersion monitoring module is configured to perform chromatic dispersion monitoring on the modulated optical signal transmitted by the optical splitter to determine a chromatic dispersion range of the modulated optical signal that is received by the coherent receiver apparatus, and enable the chromatic dispersion compensation module to perform chromatic dispersion compensation in the chromatic dispersion range monitored by the chromatic dispersion monitoring module.

A chromatic dispersion compensation method provided by an embodiment of the present disclosure includes: receiving, from an optical splitter, one path of a modulated optical signal that is received by a coherent receiver apparatus and split by the optical splitter; performing chromatic dispersion monitoring on the received path of the modulated optical signal to determine a chromatic dispersion range of the modulated optical signal that is received by the coherent receiver apparatus; and enabling a chromatic dispersion compensation module to perform chromatic dispersion compensation in the chromatic dispersion range based on the determined chromatic dispersion range.

In the foregoing solutions, an optical splitter splits a part of a modulated optical signal as original data for chromatic dispersion monitoring, where the modulated optical signal is to be coherently received; a chromatic dispersion monitoring module is disposed behind the optical splitter to perform the chromatic dispersion monitoring on the split modulated optical signals and thereby determine a chromatic dispersion range, so that a subsequent chromatic dispersion compensation module may perform chromatic dispersion compensation in the determined chromatic dispersion range. In this way, a search range of the chromatic dispersion compensation is narrowed, and the speed of chromatic dispersion compensation is increased, so that the chromatic dispersion compensation module finds a more accurate chromatic dispersion compensation value in a limited range.

DETAILED DESCRIPTION OF THE EMBODIMENTS

Since a current coherent receiver apparatus needs to scan all kinds of possible chromatic dispersion values in an electric layer, so that the coherent receiver apparatus may perform chromatic dispersion compensation based on the scanned chromatic dispersion value. In this way, the operational difficulty of the chromatic dispersion compensation is increased and the speed of the compensation algorithm is reduced. Accordingly, embodiments of the present disclosure puts forward the following solutions: the monitoring of a chromatic dispersion value is performed in an optical layer to determine a relatively narrowed chromatic dispersion range for chromatic dispersion compensation, and then the chromatic dispersion compensation is performed in an electric layer. In this way, a search range of the chromatic dispersion compensation is narrowed; the speed of the chromatic dispersion compensation is increased; and a more accurate chromatic dispersion compensation value can be found in a limited range.

The solutions of the present disclosure are illustrated in detail below with reference to FIG. 2 to FIG. 6.

Figure 1:
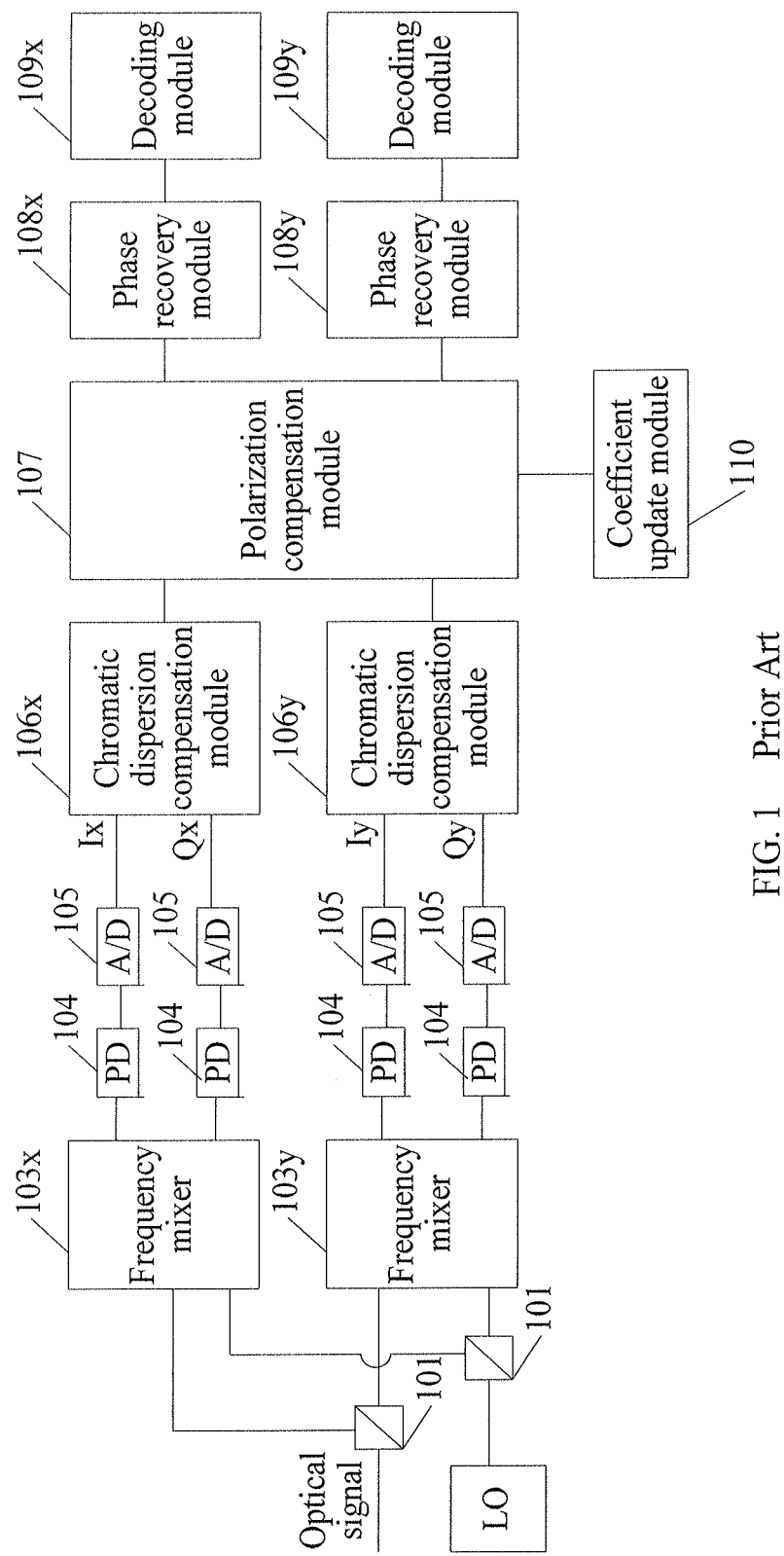
FIG. 1 is a schematic structural block diagram of a coherent receiver apparatus according to the prior art.
Figure 2:
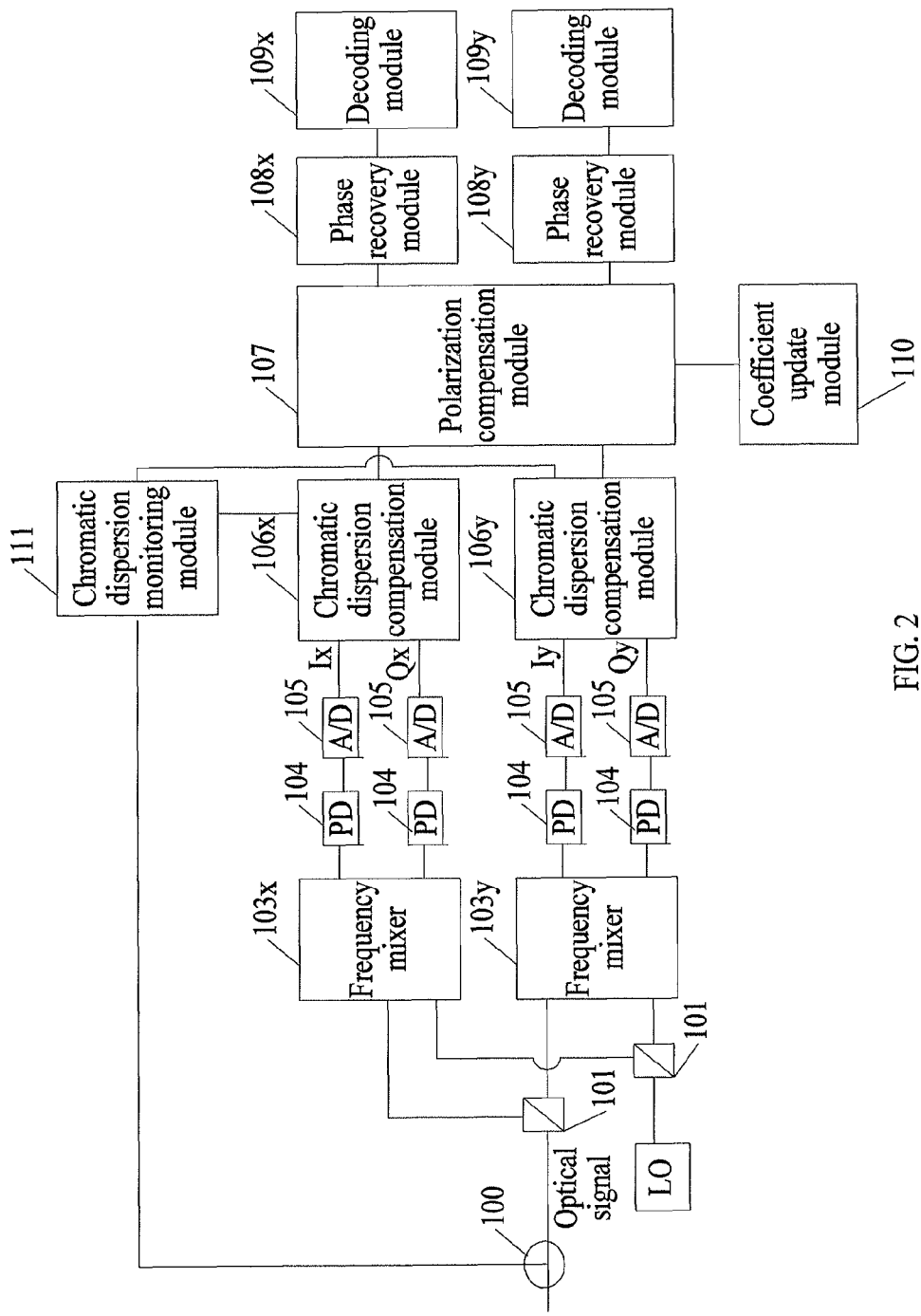
FIG. 2 is a schematic structural block diagram of an embodiment of a coherent receiver apparatus according to the present disclosure.

FIG. 2 is a schematic structural block diagram of an embodiment of a coherent receiver apparatus according to the present disclosure. As shown in FIG. 2, the coherent receiver apparatus of the present disclosure includes the following components that are also included in the coherent receiver apparatus of the prior art, namely, a polarization beam splitter 101, frequency mixers 103$x$ and 103$y$, a photodetector 104, an analog-to-digital conversion module 105, chromatic dispersion compensation modules 106$x$ and 106$y$, a polarization compensation module 107 composed of 2*2 butterfly filters, phase recovery modules 108$x$ and 108$y$, decoding modules 109$x$ and 109$y$, and a coefficient update module 110. In addition, as shown in FIG. 2, the coherent receiver apparatus of the present disclosure further includes an optical splitter 100 and a chromatic dispersion monitoring module 111. The optical splitter 100 is disposed in front of the polarization beam splitter 101. The chromatic dispersion monitoring module 111 is disposed between the optical splitter 100 and the chromatic dispersion compensation modules 106$x$ and 106$y$. The optical splitter 100 is configured to split a modulated optical signal received by the coherent receiver apparatus and then transmit the split modulated optical signal to the chromatic dispersion monitoring module 111 and the polarization beam splitter 101. The chromatic dispersion monitoring module 111 is configured to perform chromatic dispersion monitoring on the modulated optical signal transmitted by the optical splitter 100 to determine a chromatic dispersion range of the modulated optical signal that is received by the coherent receiver apparatus, and enable the chromatic dispersion compensation modules 106$x$ and 106$y$ to perform chromatic dispersion compensation in the chromatic dispersion range monitored by the chromatic dispersion monitoring module 111.

Figure 3:
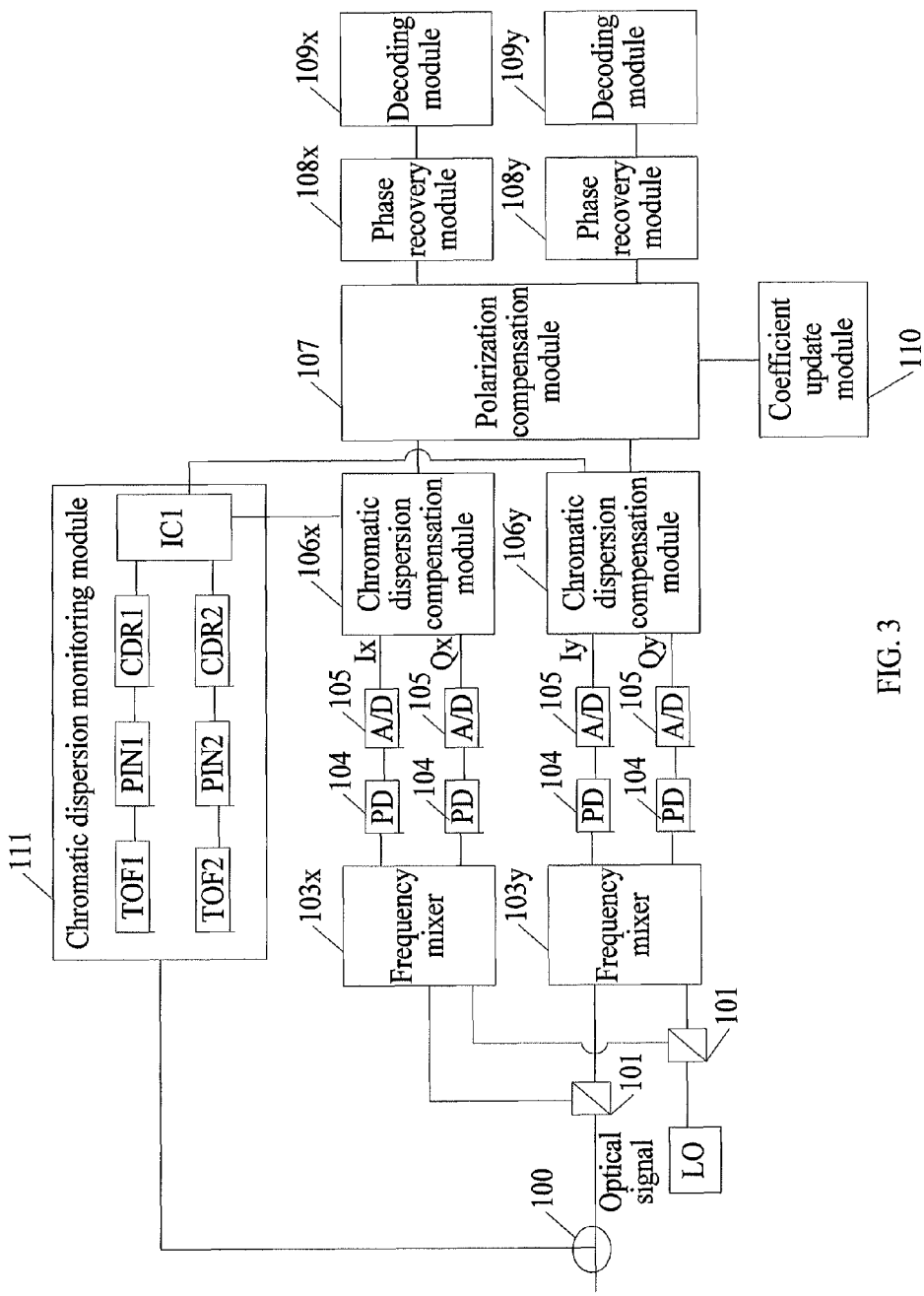
FIG. 3 is a schematic structural block diagram of an embodiment of a chromatic dispersion monitoring module in FIG. 2.
Figure 4:
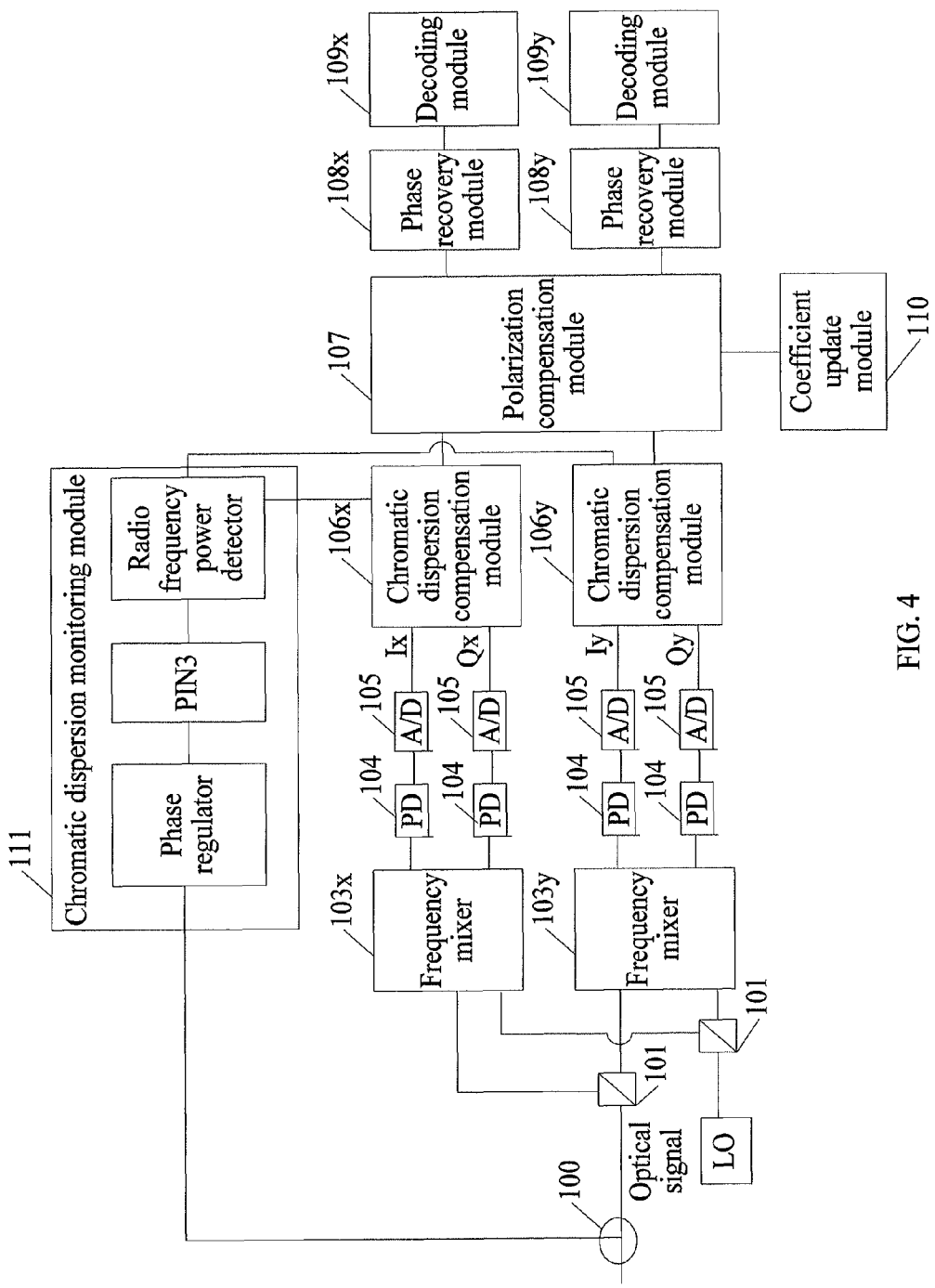
FIG. 4 is a schematic structural block diagram of another embodiment of the chromatic dispersion monitoring module in FIG. 2.

In the present disclosure, a small part of a modulated optical signal is split out by using an optical splitter at a most front end of a coherent receiver apparatus, and then chromatic dispersion monitoring is performed on the split small part of the modulated optical signal by using a chromatic dispersion monitoring module, so as to determine a rough range of chromatic dispersion, and a monitoring result of the chromatic dispersion monitoring module is provided for a chromatic dispersion compensation module for performing chromatic dispersion compensation. The advantages are as follows: an optimal chromatic dispersion value may be found in a narrowed chromatic dispersion range for performing the chromatic dispersion compensation; the complexity of the chromatic dispersion compensation algorithm is reduced; and the speed of the chromatic dispersion compensation is increased. For example, a chromatic dispersion monitoring module with a monitoring range of ±30000 ps/nm and a monitoring precision of ±2000 ps/nm may shorten the computing time to 1/16 of the original time. If the monitoring precision is further improved, the computing time may be further shortened. Moreover, during the specific implementation, the chromatic dispersion monitoring module 111 may implement the chromatic dispersion monitoring by using the methods such as a phase comparison method, a radio frequency power detection method, and a nonlinear detection method. FIG. 3 and FIG. 4 show the specific implementation of a vestigial sideband (VSB) clock phase shift detection method, a kind of the phase comparison method, for performing the chromatic dispersion monitoring, and the specific implementation of the radio frequency power detection method respectively.

As shown in FIG. 3, when the modulated optical signal received by the coherent receiver apparatus is specifically a double-sideband modulated optical signal, the chromatic dispersion monitoring module 111 may perform the chromatic dispersion monitoring by using the vestigial sideband (VSB) clock phase shift detection method. On this basis, the chromatic dispersion monitoring module 111 may include a first tunable optical filter (corresponding to TOF1 in FIG. 3), a second tunable optical filter (corresponding to TOF2 in FIG. 3), a first photodiode (corresponding to PIN1 in FIG. 3), a second photodiode (corresponding to PIN2 in FIG. 3), a first clock and data recovery circuit (corresponding to Clock and Data Recover (CDR) 1 in FIG. 3), a second clock and data recovery circuit (corresponding to CDR2 in FIG. 3), and a phase comparator (corresponding to IC1 in FIG. 3). The first tunable optical filter and the second tunable optical filter are configured to filter out an upper sideband and a lower sideband of the double-sideband modulated optical signal that is transmitted by the optical splitter. During the specific implementation, a tunable optical filter is not a compulsory option, and any filter may be used as long as the filter is capable of filtering out sidebands of a double-sideband modulated optical signal that is transmitted by the optical splitter. The first photodiode and the second photodiode are respectively configured to perform photoelectric conversion on signals output by the first tunable optical filter and the second tunable optical filter; in the specific implementation, the first photodiode and the second photodiode in this embodiment may be replaced with other photodetectors. The first clock recovery circuit and the second clock recovery circuit are respectively configured to recover a clock signal from data after the photoelectric conversion performed by the first photodiode and the second photodiode. The phase comparator is configured to compare a phase difference of the clock signals that are output by the first clock recovery circuit and the second clock recovery circuit, so as to obtain a chromatic dispersion monitoring result. In the specific implementation, the phase comparator may be a vector phase meter.

In the foregoing embodiment, an upper sideband and a lower sideband of a baseband data signal are filtered out directly by regulating two tunable optical filters TOF; after photodiodes PIN complete the photoelectric conversion, a clock signal is recovered from the received two pieces of vestigial sideband data respectively; and finally, a phase difference between the two clock signals is compared to implement the chromatic dispersion monitoring.

As shown in FIG. 4, when the radio frequency power detection method is used, the chromatic dispersion monitoring module 111 may perform the monitoring by measuring the RF power at some preset frequencies (the preset frequencies may be set by a user). On this basis, the chromatic dispersion monitoring module 111 may include a phase regulator, a photodiode (corresponding to PIN3 in FIG. 4), and a radio frequency power detector. The phase regulator is configured to regulate a phase of the modulated optical signal that is transmitted by the optical splitter, so that the radio frequency power of the modulated optical signal changes. The photodiode is configured to perform photoelectric conversion on the modulated optical signal output by the phase regulator. The radio frequency power detector is configured to detect a change of the radio frequency power of data that is output by the photodiode and is at a preset frequency, so as to obtain a chromatic dispersion monitoring result. In the specific implementation, the phase regulator may be a Mach-Zehnder interferometer or a high-birefringence fiber interferometer. The photodiode may be replaced with other photodetectors.

In the foregoing embodiment, the monitoring is performed by measuring the radio frequency power at some preset frequencies. For example, a Mach-Zehnder interferometer (MZI) or a high-birefringence fiber interferometer is added on a monitoring point, so that the chromatic dispersion may be monitored by directly measuring the radio frequency power of a baseband data signal at a certain fixed frequency. The fixed frequency depends on the time delay of the MZI or the length of the high-birefringence fiber.

Figure 5:
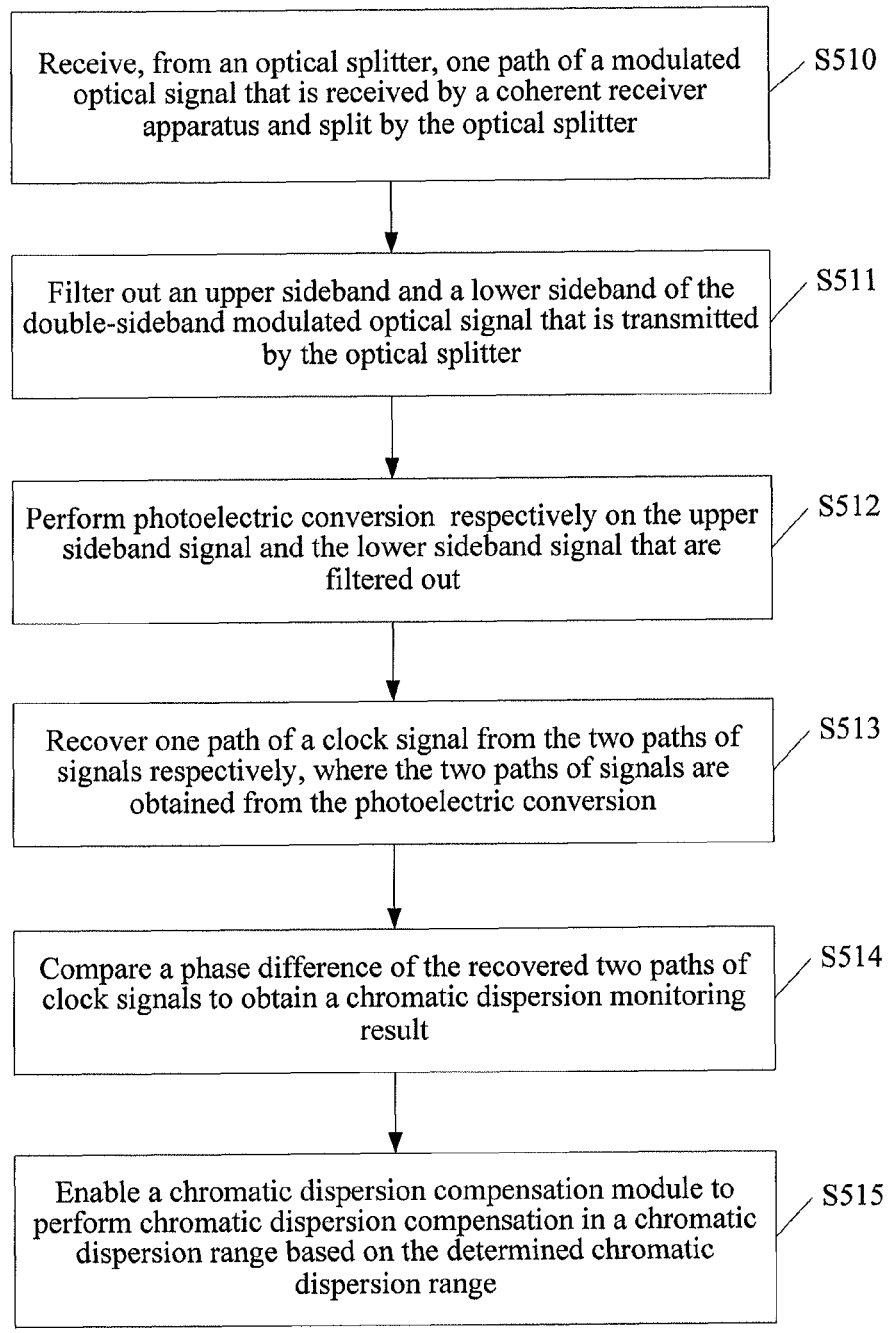
FIG. 5 is a schematic flowchart of an embodiment of a chromatic dispersion compensation method that is applied to a coherent receiver apparatus according to the present disclosure.

FIG. 5 is a schematic flowchart of an embodiment of a chromatic dispersion compensation method according to the present disclosure. As shown in FIG. 5, in the method of this embodiment, the chromatic dispersion monitoring is performed by using a phase comparison method. Specifically, the method of this embodiment includes the following.

Step S510: Receive, from an optical splitter, one path of a modulated optical signal that is received by a coherent receiver apparatus and split by the optical splitter. In the specific implementation, step S510 may be completed by TOF1 and TOF2 in the embodiment shown in FIG. 3.

Step S511: Filter out an upper sideband and a lower sideband of the double-sideband modulated optical signal that is transmitted by the optical splitter. In the specific implementation, step S511 may be completed by TOF1 and TOF2 in FIG. 3.

Step S512: Perform photoelectric conversion respectively on the upper sideband signal and the lower sideband signal that are filtered out. In the specific implementation, step S512 may be completed by PIN1 and PIN2 in FIG. 3.

Step S513: Recover one path of a clock signal from two paths of signals respectively, where the two paths of signals are obtained from the photoelectric conversion. In the specific implementation, step S513 may be performed by CDR1 and CDR2 in FIG. 3.

Step S514: Compare a phase difference of the recovered two paths of clock signals to obtain a chromatic dispersion monitoring result. In the specific implementation, step S514 may be completed by IC1 shown in FIG. 3.

Step S515: Enable a chromatic dispersion compensation module to perform chromatic dispersion compensation in a chromatic dispersion range based on the determined chromatic dispersion range. In the specific implementation, step S515 may be completed based on the compared phase difference output by IC1 shown in FIG. 3.

In the foregoing embodiment, an upper sideband and a lower sideband of a baseband data signal are filtered out directly by regulating two tunable optical filters TOF; after photodiodes PIN complete the photoelectric conversion, a clock signal is recovered from the received two vestigial sideband signals respectively; and finally, a phase difference between the two clock signals is compared to implement the chromatic dispersion monitoring. Subsequently, the chromatic dispersion compensation module performs the chromatic dispersion compensation based on the monitored chromatic dispersion range.

Figure 6:
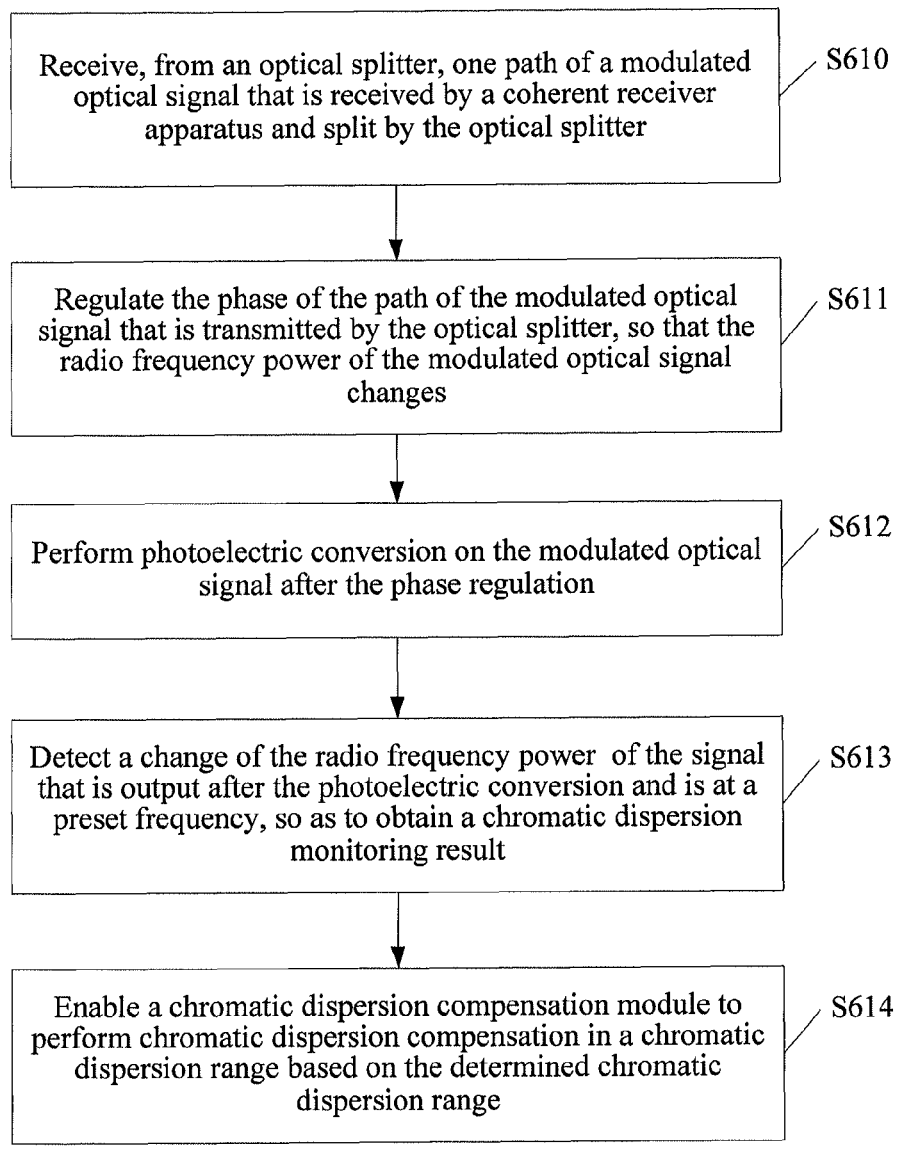
FIG. 6 is a schematic flowchart of another embodiment of the chromatic dispersion compensation method applied to a coherent receiver apparatus according to the present disclosure.

FIG. 6 is a schematic flowchart of another embodiment of the chromatic dispersion compensation method applied to the coherent receiver apparatus according to the present disclosure. As shown in FIG. 6, in the method of this embodiment, the chromatic dispersion monitoring is performed by using a radio frequency power detection method. Specifically, the method of this embodiment includes the following.

Step S610: Receive, from an optical splitter, one path of a modulated optical signal that is received by a coherent receiver apparatus and split by the optical splitter. In the specific implementation, step S610 may be completed by the phase regulator in the embodiment shown in FIG. 4.

Step S611: Regulate the phase of the path of the modulated optical signal that is transmitted by the optical splitter, so that the radio frequency power of the modulated optical signal changes. In the specific implementation, step S611 may be completed by the phase regulator in the embodiment shown in FIG. 4.

Step S612: Perform photoelectric conversion on the modulated optical signal after the phase regulation. In the specific implementation, step S612 may be completed by PIN3 in the embodiment shown in FIG. 4.

Step S613: Detect a change of the radio frequency power of the signal that is output after the photoelectric conversion and is at a preset frequency, so as to obtain a chromatic dispersion monitoring result. In the specific implementation, step S612 may be completed by the radio frequency power detector in the embodiment shown in FIG. 4.

Step S614: Enable a chromatic dispersion compensation module to perform chromatic dispersion compensation in a chromatic dispersion range based on the determined chromatic dispersion range. In the specific implementation, step S614 may be completed based on the compared phase difference output by IC1 shown in FIG. 4.

In the foregoing embodiment, the monitoring is performed by measuring the radio frequency power at some specific frequencies. For example, a Mach-Zehnder interferometer (MZI) or a high-birefringence fiber interferometer is added on a monitoring point, so that the chromatic dispersion may be monitored by directly measuring the radio frequency power of a baseband data signal at a certain fixed frequency. The fixed frequency depends on the time delay of the MZI or the length of the high-birefringence fiber.

In the solutions of the present disclosure, an optical splitter splits a part of a modulated optical signal as original data for chromatic dispersion monitoring, where the modulated optical signal is to be coherently received; a chromatic dispersion monitoring module is disposed behind the optical splitter to perform the chromatic dispersion monitoring on the split modulated optical signals and thereby determine a chromatic dispersion range, so that a subsequent chromatic dispersion compensation module may perform chromatic dispersion compensation in the determined chromatic dispersion range. In this way, a search range of the chromatic dispersion compensation is narrowed, and the speed of the chromatic dispersion compensation is increased, so that the chromatic dispersion compensation module finds a more accurate chromatic dispersion compensation value in a limited range.

Apparently, various modifications and variations can be made by persons skilled in the art to the present disclosure without departing from the spirit and the scope of the disclosure. In this way, if these modifications and variations of the present disclosure fall within the scope of the claims and equivalent technology of the present disclosure, the present disclosure is intended to include these modification and variations.

What is claimed is:

1. A coherent receiver apparatus, comprising a polarization beam splitter and a chromatic dispersion compensation module, an optical splitter and a chromatic dispersion monitoring module; and wherein:
    the optical splitter is disposed in front of the polarization beam splitter, and the chromatic dispersion monitoring module is connected between the optical splitter and the chromatic dispersion compensation module;
    the optical splitter is configured to split a modulated optical signal received by the coherent receiver apparatus and then transmit the split modulated optical signal to the chromatic dispersion monitoring module and the polarization beam splitter; and
    the chromatic dispersion monitoring module is configured to perform chromatic dispersion monitoring on the modulated optical signal transmitted by the optical splitter to determine a chromatic dispersion range of the modulated optical signal that is received by the coherent receiver apparatus; and
    the chromatic dispersion compensation module is configured to perform chromatic dispersion compensation according to the chromatic dispersion range monitored by the chromatic dispersion monitoring module; and
    the modulated optical signal transmitted by the optical splitter to the chromatic dispersion monitoring module is a double-sideband modulated optical signal; and the chromatic dispersion monitoring module further comprises: a first filter, a second filter, a first photodetector, a second photodetector, a first clock recovery circuit, a second clock recovery circuit, and a phase comparator, wherein:
    the first filter and the second filter are respectively configured to filter the double-sideband modulated optical signal transmitted by the optical splitter to obtain an upper sideband signal and a lower sideband signal of the double-sideband modulated optical signal;
    the first photodetector and the second photodetector are respectively configured to perform photoelectric conversion on obtained signals output by the first filter and the second filter;
    the first clock recovery circuit and the second clock recovery circuit are respectively configured to recover clock signals from data obtained through photoelectric conversion that is performed by the first photodetector and the second photodetector; and
    the phase comparator is configured to obtain a chromatic dispersion monitoring result according to a phase difference between the phase of the clock signal that is output by the first clock recovery circuit and the phase of the clock signal that is output by the second clock recovery circuit.

2. The coherent receiver apparatus according to claim 1, wherein:
    the first clock recovery circuit and the second clock recovery circuit are clock and data recovery circuits Clock and Data Recovery (CDRs); and
    the phase comparator is a vector meter.

3. A coherent receiver apparatus, comprising a polarization beam splitter and a chromatic dispersion compensation module, wherein:
    the coherent receiver apparatus further comprises an optical splitter and a chromatic dispersion monitoring module; and
    the optical splitter is disposed in front of the polarization beam splitter, and the chromatic dispersion monitoring module is connected between the optical splitter and the chromatic dispersion compensation module;
    the optical splitter is configured to split a modulated optical signal received by the coherent receiver apparatus and then transmit the split modulated optical signal to the chromatic dispersion monitoring module and the polarization beam splitter; and
    the chromatic dispersion monitoring module is configured to perform chromatic dispersion monitoring on the modulated optical signal transmitted by the optical slitter to determine a chromatic dispersion range of the modulated optical signal that is received by the coherent receiver apparatus; and
    the chromatic dispersion compensation module is configured to perform chromatic dispersion compensation according to the chromatic dispersion range monitored by the chromatic dispersion monitoring module; and
    the chromatic dispersion monitoring module further comprises: a phase regulator, a photodetector, and a radio frequency power detector; and
    the phase regulator is configured to regulate a phase of the modulated optical signal that is transmitted by the optical splitter, so that radio frequency power of the modulated optical signal changes;
    the photodetector is configured to perform photoelectric conversion on the modulated optical signal output by the phase regulator; and
    the radio frequency power detector is configured to detect a change of a radio frequency power of a signal that is output by the photodetector at a preset frequency, so as to obtain a chromatic dispersion monitoring result.

4. The coherent receiver apparatus according to claim 3, wherein the phase regulator comprises one of the following: a Mach-Zehnder interferometer and a high-birefringence fiber interferometer.

5. A chromatic dispersion compensation method, comprising:
    receiving, from an optical splitter, one path of a modulated optical signal that is received by a coherent receiver apparatus and split by the optical splitter;
    performing chromatic dispersion monitoring on the received path of the modulated optical signal to determine a chromatic dispersion range of the modulated optical signal that is received by the coherent receiver apparatus; and
    performing, by a chromatic dispersion compensation module, chromatic dispersion compensation according to the chromatic dispersion range based on the determined chromatic dispersion range; and the received path of the modulated optical signal is a double-sideband modulated optical signal, and the performing the chromatic dispersion monitoring on the received path Of the modulated optical signal to determine the chromatic dispersion range of the coherent receiver apparatus further comprises:

respectively filtering the double-sideband modulated optical signal transmitted by the optical splitter to obtain an upper sideband signal and a lower sideband signal of the double-sideband modulated optical signal;

performing photoelectric conversion respectively on the upper sideband signal and the lower sideband signal;

recovering an upper sideband clock signal and a lower sideband clock signal from the upper sideband signal after photoelectric conversion and from the lower sideband signal after photoelectric conversion respectively; and obtaining a chromatic dispersion monitoring result according to a phase difference between the upper sideband clock signal and the lower sideband clock signal.

6. A chromatic dispersion compensation method, comprising:

receiving, from an optical splitter, one path of a modulated optical signal that is received by a coherent receiver apparatus and split by the optical splitter;

performing chromatic dispersion monitoring on the received path of the modulated optical signal to determine a chromatic dispersion range of the modulated optical signal that is received by the coherent receiver apparatus; and performing, by a chromatic dispersion compensation module, chromatic dispersion compensation according to the chromatic dispersion range based on the determined chromatic dispersion range; and performing the chromatic dispersion monitoring on the received path of the optical signal to determine the chromatic dispersion range of the modulated optical signal that is received by the coherent receiver apparatus further comprises:

regulating a phase of the path of the modulated optical signal that is transmitted by the optical splitter, so that radio frequency power of the modulated optical signal changes;

performing photoelectric conversion on the modulated optical signal after the phase regulation; and detecting a change of a radio frequency power of a signal that is output after the photoelectric conversion at a preset frequency, so as to obtain a chromatic dispersion monitoring result.

7. A coherent receiver apparatus, wherein the coherent receiver apparatus comprises an optical splitter, a chromatic dispersion monitoring module, a polarization beam splitter, a mixer, a photodetector, an analog-to-digital conversion module, a chromatic dispersion compensation module; and the optical splitter is configured to split an optical signal received by the coherent receiver apparatus to obtain a first split optical signal and a second split optical signal, and transmit the first split optical signal optical signal to the chromatic dispersion monitoring module and transmit the second split optical signal to the polarization beam splitter; and the chromatic dispersion monitoring module is configured to perform chromatic dispersion monitoring on the first split optical signal to determine a chromatic dispersion range and transmit the chromatic dispersion range to the chromatic dispersion compensation module; and the polarization beam splitter is configured to split the second split optical signal received from the optical splitter; and the mixer is configured to mix optical signal received from the polarization beam splitter with an optical signal from a local oscillator; and the photodetector is configured to perform photoelectric conversion on mixed optical signal received from the mixer and output electrical analog signal; and the analog-to-digital conversion module is configured to perform analog-to-digital conversion on the electrical analog signal received from the photodetector to obtain electrical digital signal; and the chromatic dispersion compensation module is configured to receive the dispersion range from the chromatic dispersion monitoring module, determine a chromatic dispersion compensation amount according to the dispersion range and perform chromatic dispersion compensation on the electrical digital signal according to the chromatic dispersion compensation amount.

8. A chromatic dispersion compensation method applied in a coherent receiver apparatus, wherein the coherent receiver apparatus comprises an optical splitter, a chromatic dispersion monitoring module, a polarization beam splitter, a mixer, a photodetector, an analog-to-digital conversion module, a chromatic dispersion compensation module, the chromatic dispersion compensation method comprising splitting an optical signal received by the coherent receiver apparatus to obtain a first split optical signal and a second split optical signal, and transmitting the first split optical signal optical signal to the chromatic dispersion monitoring module and transmitting the second split optical signal to the polarization beam splitter; and performing chromatic dispersion monitoring on the first split optical signal to determine a chromatic dispersion range and transmitting the chromatic dispersion range to the chromatic dispersion compensation module; and splitting the second split optical signal received from the optical splitter; and mixing optical signal received from the polarization beam splitter with an optical signal from a local oscillator; and performing photoelectric conversion on mixed optical signal received from the mixer and outputting electrical analog signal; and performing analog-to-digital conversion on the electrical analog signal received from the photodetector to obtain electrical digital signal; and receiving the dispersion range from the chromatic dispersion monitoring module, determining a chromatic dispersion compensation amount according to the dispersion range and performing chromatic dispersion compensation on the electrical digital signal according to the chromatic dispersion compensation amount.

* * * * *

UNITED STATES PATENT AND TRADEMARK OFFICE
CERTIFICATE OF CORRECTION

| | |
|---|---|
| PATENT NO. | : 8,861,979 B2 |
| APPLICATION NO. | : 13/565458 |
| DATED | : October 14, 2014 |
| INVENTOR(S) | : Ning Liu |

It is certified that error appears in the above-identified patent and that said Letters Patent is hereby corrected as shown below:

<u>In the Claims</u>

In column 8, claim 3, lines 30-31, after "transmitted by the optical" replace "slitter" with --splitter--.

Signed and Sealed this
Twenty-fourth Day of February, 2015

Michelle K. Lee
*Deputy Director of the United States Patent and Trademark Office*